May 21, 1957 A. V. LOUGHREN 2,793,247

COLOR-IMAGE-REPRODUCING APPARATUS OF THE PROJECTION TYPE

Filed May 17, 1954 2 Sheets-Sheet 1

2,793,247
Patented May 21, 1957

2,793,247

COLOR-IMAGE-REPRODUCING APPARATUS OF THE PROJECTION TYPE

Arthur V. Loughren, Great Neck, N. Y., assignor to Hazeltine Research, Inc., Chicago, Ill., a corporation of Illinois Application May 17, 1954, Serial No. 430,198

7 Claims. (Cl. 178—5.4)

GENERAL

Figure 1:
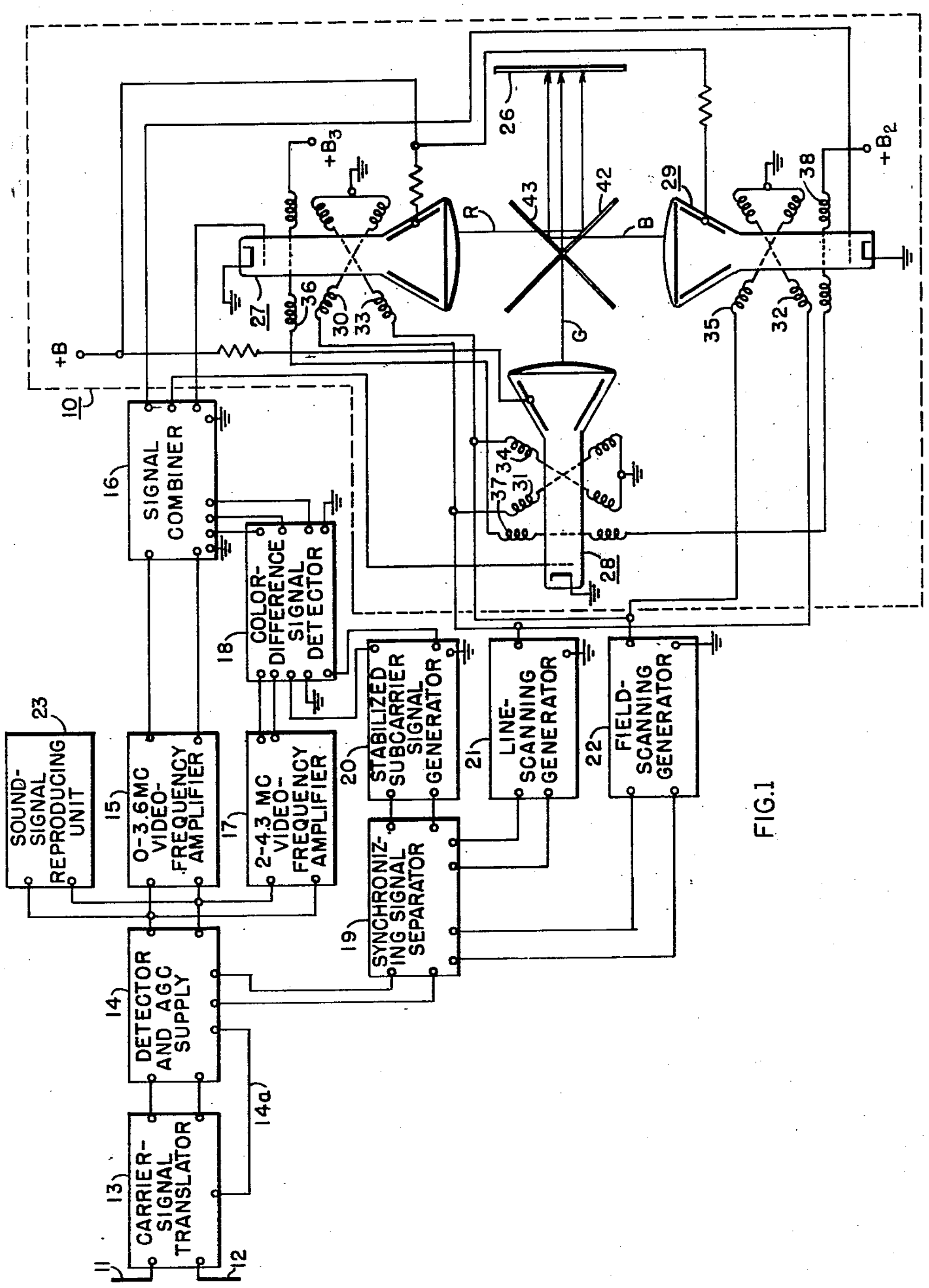

This invention relates to color-image-reproducing apparatus of the projection type suitable for use in a color-television receiver, and, more particularly, to such apparatus in which component color images are projected for a substantial distance along a common path.

Color-image-reproducing apparatus of the projection type heretofore proposed in which component color images are projected for a substantial distance along a common path have had the disadvantage that spurious electric or magnetic fields, such as the earth's magnetic field, tend to cause misregistration of the component color images on the receiver display screen if the apparatus is physically displaced or if the field is changed either in direction or intensity. Such misregistration of the component color images, although it may be slight, is extremely objectionable because it results in color distortion of the displayed image.

It is an object of the present invention, therefore, to provide a new and improved color-image-reproducing apparatus of the projection type which minimizes the tendency of spurious fields to cause misregistration.

It is another object of the invention to provide a new and improved color-image-reproducing apparatus of the projection type for use in a color-television receiver which is capable of maintaining the several reproduced component color images in register when the apparatus is physically displaced or when there is a change in any uniform spurious fields which might tend to cause misregistration.

It is another object of the invention to provide a new and improved color-image-reproducing apparatus of the projection type for use in a color-television receiver in which there is eliminated degradation of the register of the component color images reproduced on the projection screen thereof due to the earth's magnetic field when the apparatus is physically displaced or when the field changes.

In accordance with a particular form of the invention, in a color-television receiver including circuit means for supplying signals representative of predetermined primary colors of a composite color image to be reproduced, circuit means for supplying scanning signals, and an image-display screen, color-image-reproducing apparatus of the projection type for displaying on the screen component color images and subject to a common spurious field which displaces the component color images comprises a plurality of cathode-ray image-reproducing devices responsive jointly to the color-representative signals and the scanning signals for individually developing component color images individually representative of the primary colors of the composite image. The apparatus also includes an optical system, including a pair of intersecting dicloric elements, for projecting the component color images for a substantial distance along a common path to register on the receiver screen. Two or more of the cathode-ray devices and the optical system are so interrelated that a common spurious field causes the scanning rasters of the cathode-ray devices to shift in the same direction as projected on the display screen, thereby preventing degradation of the image register on the display screen due to changes in the field.

For a better understanding of the present invention, together with other and further objects thereof, reference is had to the following description taken in connection with the accompanying drawings, and its scope will be pointed out in the appended claims.

Figure 2:
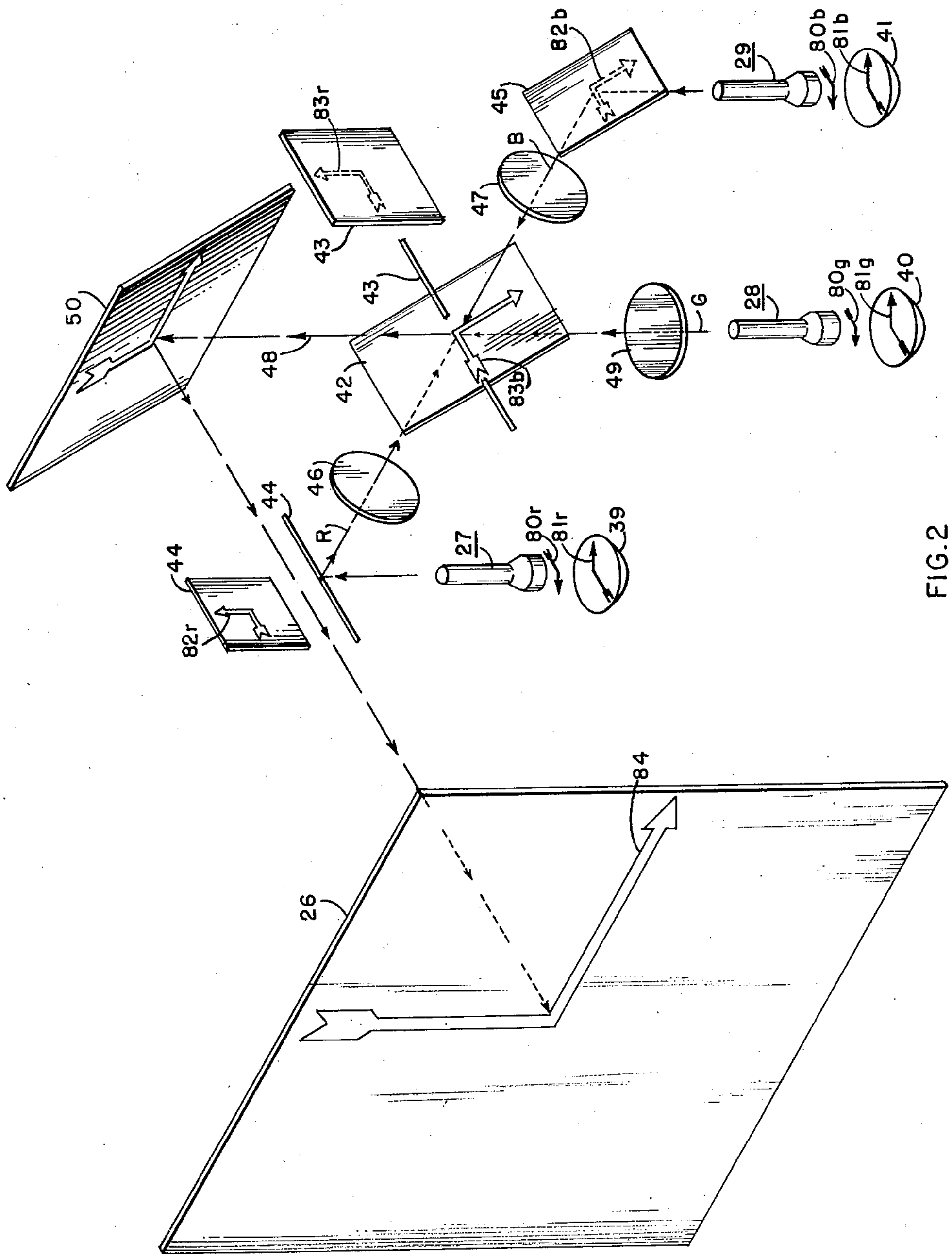

Referring to the drawings:

Fig. 1 is a circuit diagram, partly schematic, of a color-television receiver including color-image-reproducing apparatus of the projection type constructed in accordance with the invention, and Fig. 2 is a diagrammatic illustration of the cathode-ray image-reproducing devices and optical system of the Fig. 1 apparatus.

*General description of Fig. 1 color-television receiver*

Referring now more particularly to Fig. 1 of the drawings, there is represented a color-television receiver of the image-projection type including color-image-reproducing apparatus 10, constructed in accordance with the invention and more fully described hereinafter. With the exception of the image-reproducing apparatus 10, the receiver may be of a conventional type, for example, of a constant-luminance type described and claimed in the copending application of Bernard D. Loughlin, Serial No. 159,212, filed May 1, 1950, and entitled "Color-Television System," now Patent 2,773,929. Receivers of this type are further described in the October 1951 issue of the Proceedings of the IRE in an article entitled "Recent improvements in band-shared simultaneous color-television systems" by Loughlin, and in an article by Hirsch, Bailey, and Loughlin entitled "Principles of NTSC compatible color television," Electronics, February 1952.

The Fig. 1 receiver includes an antenna system 11, 12, a carrier-signal translator 13 which may be of the conventional superheterodyne type and a detector and automatic-gain-control or (AGC) supply 14, coupled in cascade and in the order named, for receiving a wave signal modulated by a composite color video-frequency signal and for deriving the latter signal therefrom. The AGC supply of unit 14 is coupled to the input circuit of one or more stages of unit 13 by a control-circuit conductor **14*a***.

There is connected to the detector and AGC supply 14 a video-frequency amplifier 15 for translating at least the low-frequency portion of the video-frequency signal, and preferably the frequency band of 0–3.6 megacycles comprising the monochrome-signal component capable of reproducing an image substantially of the type normally reproduced in a conventional monochrome or black-and-white receiver and, thus, representative of the brightness and detail of the image. The output circuit of the video-frequency amplifier 15 is connected to an input circuit of a signal combiner 16 of a conventional type which may comprise, for example, three adders having individual input circuits coupled to the amplifier 15.

There is also connected to the output circuit of the detector of the unit 14 a signal-translating channel responsive to the modulated subcarrier signal component of the video-frequency signal derived by the detector for supplying three color-difference signals. This channel includes a video-frequency amplifier 17 having a pass band of, for example, 2–4.3 megacycles and a color-difference signal detector 18 coupled thereto and preferably comprising a matrixing system for deriving color-difference signals which, relative to the monochrome or luminance-signal component, represent the chromaticity or color quality of an image definable by its dominant wave length and its purity taken together. The matrixing system of the detector 18 preferably is proportioned in accordance with the teaching of the above-mentioned Loughlin application to impart a constant-luminance characteristic to the receiver. The color-difference signal detector 18 has three output circuits individually connected to the input circuits of the three adders of the signal combiner 16 for supplying the color-difference signals thereto for combination with the monochrome signal to develop three color signals individually representative of predetermined primary colors of the color image to be reproduced. The three output circuits of the signal combiner 16 are individually connected to cathode-ray image-reproducing devices of the apparatus 10, as will be more fully described subsequently.

The term "predetermined primary color," as used herein and in the appended claims with reference to a color image, is defined by predetermined dominant wave length and purity factors and by a variable intensity factor determined by the image. Further, the primary colors individually represent distinct and widely spaced regions of the visible spectrum. No primary color of a selected set of, for example, three primary colors can be matched by a combination of any other primary colors of the set.

The receiver also includes a synchronizing-signal separator 19 for deriving the subcarrier synchronizing signal and line-synchronizing and field-synchronizing signals from the video-frequency signals applied thereto by the unit 14. One output circuit of the synchronizing-signal separator 19 is coupled to a stabilized subcarrier signal generator 20 of conventional phase-controlled oscillator design having a pair of output circuits connected to the input circuits of the color-difference signal detector 18 for providing a pair of phase-displaced unmodulated subcarrier signals, for example, signals in phase quadrature, for individually beating with the modulated subcarrier signal component applied to the color-difference signal detector by the amplifier 17 to derive in the detector 18 the color-difference signals. The receiver also includes line-scanning and field-scanning generators 21 and 22, respectively, connected in a conventional manner to the scanning circuits of the image-reproducing apparatus 10 for effecting synchronous scanning of the individual cathode-ray tubes thereof.

The television receiver also includes a sound-signal reproducing unit 23 of conventional construction connected to the detector of the unit 14 and comprising the usual sound intermediate-frequency amplifier, frequency-modulation detector, audio-frequency amplifier, and loudspeaker.

*General operation of Fig. 1 color-television receiver*

Considering briefly the operation of the Fig. 1 receiver as a whole, a modulated color-television wave signal intercepted by the antenna system 11, 12 is selected by the carrier-signal translator 13 which amplifies and converts the same to an intermediate-frequency signal and supplies that signal to the detector of the unit 14. The detector of unit 14 derives the modulation components comprising a video-frequency signal having a luminance component comprising frequency components in a band of, for example, 0–3.6 megacycles. The video-frequency signal is translated through the video-frequency amplifier 15 to the signal combiner 16 for combination with color-difference signals supplied thereto in a manner more fully explained hereinafter.

For the purpose of developing color images in the color-image-reproducing apparatus 10, a modulated subcarrier signal component in the frequency band of 2–4.3 megacycles of the video-frequency signal derived by the detector of the unit 14 is translated through the video-frequency amplifier 17 and applied to the color-difference signal detector 18. The quadrature-phase subcarrier output signals of the stabilized subcarrier signal generator 20 beat with the modulated subcarrier signal component applied to the color-difference signal detector to develop in the individual output circuits thereof separate color-difference signals individually including 0–2 megacycle frequency bands and comprising the modulation components of the modulated subcarrier signal component and which, relative to the luminance signal component, represent the chromaticity components of the predetermined primary colors of the composite color image to be reproduced, for example, the red, green, and blue chromaticity components. The red, green, and blue color-difference signals then effectively are individually combined in the signal combiner 16 with the luminance component applied thereto to provide, for example, red, green, and blue color signals individually representative of the intensities of predetermined primary colors of the image to be reproduced, which are applied to the apparatus 10 in a conventional manner.

The synchronizing-signal components of the video-frequency signal developed in the output circuit of the unit 14 are separated from the luminance and color-difference signal components by the separator 19 and are applied to the line-scanning and field-scanning generators 21 and 22 to synchronize the operation thereof. These generators preferably supply signals of saw-tooth wave form for application to the deflection circuits of the color-image-reproducing apparatus 10 to control the line-scanning and field-scanning operations thereof. If necessary, the relative signal values applied to the scanning circuits of the individual cathode-ray tubes may be adjusted by suitable impedance means (not shown) in circuit with the individual scanning circuits. The synchronizing-signal separator 19 also derives a synchronizing signal comprising, for example, several cycles of an unmodulated subcarrier reference signal for controlling the phases of the output signals of the generator 20 in a conventional manner.

The automatic-gain-control or AGC signal derived in unit 14 is effective to control the amplification of one or more stages of the unit 13 to maintain the signal input to the detector of the unit 14 within a relatively narrow range for a wide range of received signal intensities.

In accordance with the operating principles of an intercarrier television receiver, the sound intermediate-frequency signal supplied by the carrier-signal translator 13 beats in the detector of the unit 14 with the picture intermediate-frequency signal to derive a second sound intermediate-frequency signal in the detector output circuit. This sound intermediate-frequency signal is amplified in the unit 23 and the audio-frequency modulation components thereof are derived and converted into sound in a conventional manner.

*Description of color-image-reproducing apparatus of Fig. 1 receiver*

Referring now more particularly to the color-image-reproducing apparatus 10 of the Fig. 1 receiver, the apparatus preferably includes an image-display screen 26 of suitable distributing material and a plurality of cathode-ray image-reproducing devices responsive to the supplied signals for individually developing component color images individually representative of the primary colors of the composite image. The term "component color images," in referring to images developed by the cathode-ray devices, is employed in its broad sense to designate light representative of images which may be out of focus or invisible to the eye, as well as visible sharply defined images. In the Fig. 1 tricolor system, the apparatus 10 preferably includes three cathode-ray devices 27, 28, and 29. These devices may be conventional image-projection tubes including the usual cathode, control electrode, and anode and associated circuit connections. More particularly, the cathodes and control electrodes of the devices are coupled to three output circuits of the signal combiner 16.

The cathode-ray tubes 27, 28, and 29 also have the usual individual beam-deflection circuits comprising line-scanning windings 30, 31, and 32, respectively, and field-scanning windings 33, 34, and 35, respectively. To develop color images individually corresponding to predetermined primary colors, for example, red, green, and blue, the tubes 27, 28, and 29 may have phosphor screens for emitting, for example, red, green, and blue light, respectively. Alternatively, the tubes may utilize phosphor screens which emit wide-band light for use in connection with suitable light filters which individually transmit, for example, only red, green, and blue light, effectively to impart desired hue and saturation factors to individual images developed at the faces of the tubes 27, 28, and 29.

The cathode-ray tubes 27, 28, and 29 preferably have focusing means comprising individual electromagnetic windings 36, 37, 38, respectively, series-connected across a voltage supply $+B_2$, $+B_3$ which preferably is of a type described and claimed in applicant's copending application Serial No. 422,434, filed April 12, 1954, and entitled "Color-Image-Reproducing Apparatus," now abandoned in favor of application Serial No. 471,340, filed November 26, 1954, for maintaining the tubes 27, 28, 29 in image focus and image register notwithstanding anode supply voltage variations.

The color-image-reproducing apparatus 10 preferably includes an optical system shown in part in Fig. 1 and fully represented in Fig. 2 including, for example, dichroic mirror means intermediate the tubes 27, 28, 29 and the screen 26 for projecting thereon component color images in register. The dichroic mirror means may comprise, for example, a red-light-reflective mirror 42 which transmits green and blue light and a blue-light-reflective mirror 43 which transmits red and green light disposed at right angles relative to each other. By the term "optical system" is meant any suitable system capable of transmitting light to develop a visual image on a display screen.

*Description and operation of Fig. 2 apparatus*

Referring now more particularly to Fig. 2 of the drawings, the actual relative physical positions of the red, green, and blue cathode-ray tubes 27, 28, 29 and the optical system associated therewith are diagrammatically represented. The cathode-ray tubes 27, 28, 29 preferably are disposed with their longitudinal axes substantially parallel to each other and substantially parallel to the common optical axis of the various optical systems which is normal to the intersection axis of dichroic mirrors 42, 43. The tubes 27, 28, 29 preferably are disposed with their faces opposite light-focusing spherical mirrors 39, 40, 41, respectively. The mirrors 39 and 41 reflect images from the cathode-ray tube faces to plane mirrors 44, 45, respectively, which preferably are disposed parallel to dichroic mirrors 43 and 42, respectively. The mirror 44 is represented in a position tilted from its actual position so that the mirror face will be apparent in the drawing. The mirrors 44 and 45 reflect images from the mirrors 39 and 41, respectively, through aspherical correction lenses 46, 47, respectively, to dichroic mirrors 43, 42, respectively, where they are again reflected and translated along the common optical axis of the system, as represented by arrows 48. The mirror 40 disposed opposite the face of the green cathode-ray tube 28 reflects the image through an aspherical correction lens 49 and through the dichroic mirrors 42, 43 along the common optical axis 48 of the system. Thus, the red, green, and blue superimposed images are reflected to a plane mirror 50 suitably disposed in the receiver cabinet for reflection to the display screen 26. The spherical mirrors 39, 40, 41, the aspherical correction lenses 46, 47, 49, and the dichroic mirrors 42, 43, the mirror 50, and display screen 26 may all be of conventional construction and preferably are rigidly mounted at predetermined distances from each other by means not shown.

Considering now in detail the image translations from the cathode-ray tube faces to the display screen, it will be assumed that an image represented by an arrow 80*g* is developed on the face of the cathode-ray tube 28, as would be apparent to an observer viewing the screen of the cathode-ray tube from the electron gun. The tail of the arrow 80*g* may then be considered as indicating the field-scanning direction while the head of the arrow indicates the line-scanning direction during visible trace time.

The image represented by arrow 80*g* is reversed and reflected by the spherical mirror 40, as indicated for purposes of explanation by arrow 81*g* at the mirror 40. It will be understood, however, that a visible image does not appear at the mirror 40. The mirror 40 reflects the image represented by arrow 81*g* through the lens 49 and dichroic mirrors 42, 43 to the plane mirror 50 which reflects the image to the display screen 26 where it is a visible image component.

The blue cathode-ray tube 29 develops an image similarly represented in scanning direction by arrow 80*b* which is reversed upon reflection from the spherical mirror 41, as indicated by arrow 81*b*, and is translated to mirror 45 as indicated by arrow 82*b* represented in broken-line construction to indicate observation of the back or non-reflective surface of the mirror 45. The image represented by arrow 82*b* is then reflected through lens 47 to the blue-light-reflective dichroic mirror 42 which, in turn, reflects the image represented by arrow 83*b* along the common optical axis 48 to the mirror 50 in the manner indicated in the drawing. The blue image component then is in register with the green image component on the mirror 50 and on the display screen 26 to which they are translated in a similar manner.

Likewise, the red cathode-ray tube 27 develops an image represented by arrow 80*r* which is reflected and reversed by mirror 39 as indicated by arrow 81*r*, and translated to plane mirror 44 in the manner indicated by arrow 82*r*. The image indicated by arrow 82*r* is reflected by the mirror 44 through the lens 46 to the red-light-reflective dichroic mirror 43 in the manner indicated by arrow 83*r*. The mirror 43 then reflects the red image to the mirror 50 and the display screen 26, in register with the green and blue image components on the display screen 26. From the foregoing explanation, it will be apparent that the cathode-ray tubes 27, 28, 29 have the same line-scanning and field-scanning directions during visible trace time with respect to an observer of the apparatus.

Assuming now that the apparatus is displaced, as by a repositioning of the receiver cabinet in the observer's home, the earth's magnetic field causes a displacement of the scanning rasters of the cathode-ray tubes 27, 28, 29 as a result of its effect on the cathode-ray beams of the tubes. However, since the tubes are positioned with parallel longitudinal axes and their screens facing in a common direction, the rasters of the three tubes move in the same direction and to the same extent. For example, a physical displacement of the apparatus might result in a displacement of the rasters of the tubes in the direction of line scan during visible trace time, that is, in the directions indicated by heads of arrows 80*r*, 80*g*, 80*b*. Reflections of the image raster displacements occur in a manner similar to reflections of the images represented by arrows 80*r*, 80*g*, 80*b*, as previously explained. Thus, image raster displacements in the direction indicated by the heads of arrows 80*r*, 80*g*, 80*b* on the cathode-ray tube faces cause component image raster displacements on the display screen 26 in the direction of the head of arrow 84. Accordingly, the three component color image rasters shift in the same direction and by the same amount on the display screen and, thus, misregistration of the three images is prevented. The same result is obtained if the displacement is due to other spurious fields common to tubes 27, 28, and 29 and is obtained regardless of whether the displacement is due to physical displacement of the receiver or to change in the intensity or direction of the spurious field.

From the foregoing description, it will be apparent that color-image-reproducing apparatus of the projection type, constructed in accordance with the invention, has the advantage that spurious electromagnetic fields, such as the earth's field, do not cause misregistration of the projected component color images when the apparatus is displaced or if the field is changed either in intensity or direction.

By spurious field is meant an electric or magnetic field which is undesired in the apparatus and originates from various incidental sources, such as the earth, neighboring electric equipment or common electrostatic charging effects. As employed in the appended claims, the term "changes in the field" is meant to include field changes in the apparatus caused by displacement of the apparatus as well as changes of the intensity or direction of the field when the apparatus is stationary.

While the Fig. 2 embodiment of the invention is preferred because it prevents degradation of the register of three image components on the display screen due to changes of the field in magnitude or in direction or due to displacement of the apparatus, for some applications it may be satisfactory to prevent degradation of the image register of only two image components displayed on the screen. Moreover, it may be satisfactory to prevent degradation of the image register due to changes in less than all differently directed field components under operating conditions such as when the remaining component does not change in its relation to the apparatus. Accordingly, considerable latitude of apparatus design within the spirit of the invention may be employed.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A projector for superimposing two or more different color-television images in register to be viewed on a display screen as a single image by an observer comprising: a pair of intersecting dichroic elements; two or more parallel cathode-ray tubes positioned adjacent different ones of the dihedral angles of the dichroic elements; and optical means for directing images on the cathode-ray tubes into different ones of the dihedral angles of the dichroic elements in such manner that they emerge in register from the fourth dihedral angle and that like shifts of the scanning rasters on the faces of the tubes result in shifts in the same direction on the display screen, whereby a spurious field common to the tubes is ineffective to degrade the register on the display screen when the field changes.

2. A projector for superimposing three different color-television images in register to be viewed on a display screen as a single image by an observer comprising: a pair of dichroic elements intersecting at right angles; three cathode-ray tubes positioned with their axes parallel to each other and normal to the intersection axis of the dichroic elements and their bases extending in the same direction and the tubes being adjacent different ones of the dihedral angles of the dichroic elements; and optical means for directing images on the cathode-ray tubes into different ones of the dihedral angles of the dichroic elements in such manner that all emerge in register from the fourth dihedral angle and that like shifts of the scanning rasters on the faces of the tubes result in shifts in the same direction on the display screen, whereby a spurious field common to the tubes is ineffective to degrade the register on the display screen when the field changes.

3. A projector for superimposing three different color-television images in register to be viewed on a display screen as a single image by an observer comprising: a pair of dichroic elements intersecting at right angles; three cathode-ray tubes positioned with their axes parallel to each other and normal to the intersection axis of the dichroic elements and their bases extending in the same direction and the tubes being adjacent different ones of the dihedral angles of the dichroic elements; and optical means including spherical mirrors opposite the cathode-ray tube faces, a pair of plane mirrors opposite two of the cathode-ray tube faces and parallel to the dichroic elements, and aspherical correction lenses parallel to each other and normal to the cathode-ray tube axes for directing images on the cathode-ray tubes into the adjacent dihedral angles in such manner that all emerge in register from the fourth dihedral angle and that like shifts of the scanning rasters on the faces of the tubes result in shifts in the same direction on the display screen, whereby a spurious field common to the tubes is ineffective to degrade the register on the display screen when the field changes.

4. In a color-television receiver including circuit means for supplying signals representative of predetermined primary colors of a composite color image to be reproduced, circuit means for supplying scanning signals, and an image-display screen, color-image-reproducing apparatus of the projection type for displaying on the screen component color images and subject to a common spurious field which displaces the component color images comprising: a plurality of cathode-ray image-reproducing devices responsive jointly to the color-representative signals and the scanning signals for individually developing component color images individually representative of said primary colors of said composite image; and an optical system, including a pair of intersecting dichroic elements, for projecting said component color images for a substantial distance along a common path to register on the receiver screen; two or more of said cathode-ray devices and said optical system being so interrelated that a common spurious field causes the scanning rasters of said cathode-ray devices to shift in the same direction as projected on the display screen, thereby preventing degradation of the image register on the display screen due to changes in the field.

5. In a color-television receiver including circuit means for supplying signals representative of predetermined primary colors of a composite color image to be reproduced, circuit means for supplying scanning signals, and an image-display screen, color-image-reproducing apparatus of the projection type for displaying on the screen component color images and subject to a common spurious field which displaces the component color images comprising: a plurality of cathode-ray image-reproducing devices responsive jointly to the color-representative signals and the scanning signals for individually developing component color images individually representative of said primary colors of said composite image; and an optical system, including light-condensing spherical-mirror means, light-directing plane-mirror means, aspherical correction lens means, and a pair of intersecting dichroic mirrors for focusing component color images and, for projecting the same to the receiver screen in register; said cathode-ray devices and said optical system being so interrelated that a common spurious field causes the scanning rasters of said cathode-ray devices to shift in the same direction as projected on the display screen, thereby preventing degradation of the image register on the display screen due to changes in the field.

6. In a color-television receiver including circuit means for supplying signals representative of predetermined primary colors of a composite color image to be reproduced, circuit means for supplying scanning signals, and an image-display screen, color-image-reproducing apparatus of the projection type for displaying on the screen component color images and subject to a common spurious field which displaces the component color images comprising: a plurality of cathode-ray image-reproducing tubes having parallel longitudinal axes responsive jointly to the color-representative signals and the scanning signals for individually developing component color images individually representative of said primary colors of said composite image; and an optical system, including a pair of intersecting dichroic elements, for projecting said component color images for a substantial distance along a common path to register on the receiver screen; two or more of said cathode-ray tubes being so positioned with respect to said optical system that a common spurious field causes the scanning rasters of said cathode-ray tubes to shift in the same direction as projected on the display screen when the field changes, thereby preventing degradation of the image register on the display screen.

7. In a color-television receiver including circuit means for supplying signals representative of predetermined primary colors of a composite color image to be reproduced, circuit means for supplying scanning signals, and an image-display screen, color-image-reproducing apparatus of the projection type for displaying on the screen component color images and subject to a common spurious field which displaces the component color images comprising: a plurality of cathode-ray image-reproducing devices having parallel longitudinal axes responsive jointly to the color-representative signals and the scanning signals for individually developing component color images individually representative of said primary colors of said composite image; and optical systems, including a common pair of intersecting dichroic elements and having a common optical axis parallel to said longitudinal axes of said cathode-ray devices, for projecting said component color images on the receiver screen in register; said cathode-ray devices being so positioned with respect to said optical systems that a common spurious field causes the scanning rasters of said cathode-ray devices to shift in the same direction as projected on the display screen when the field changes, thereby preventing degradation of the image register on the display screen.

References Cited in the file of this patent

UNITED STATES PATENTS

| | | |
|---|---|---|
| 2,568,543 | Goldsmith | Sept. 18, 1951 |
| 2,672,502 | Albright | Mar. 16, 1954 |